(No Model.)

P. ACKERMANN.
IRRIGATING APPARATUS.

No. 416,247.  Patented Dec. 3, 1889.

Fig. 5ᵃ.

Witnesses:
Wm Wagner
A Houghman

Inventor:
P. Ackermann
by his attorneys
Roeder & Briesen

United States Patent Office.

PAUL ACKERMANN, OF SALISCH, NEAR GLOGAU, PRUSSIA, GERMANY.

IRRIGATING APPARATUS.

SPECIFICATION forming part of Letters Patent No. 416,247, dated December 3, 1889.

Application filed June 29, 1889. Serial No. 316,030. (No model.)

*To all whom it may concern:*

Be it known that I, PAUL ACKERMANN, a subject of the King of Prussia and Emperor of Germany, residing at Salisch, near Glogau, in the Kingdom of Prussia, German Empire, have invented certain new and useful Improvements in Apparatus for Irrigating Fields, Meadows, and other Lands, of which the following is a specification.

My invention relates to an improvement in apparatus for irrigating lands, fields, or meadows which require systematic irrigation to remain fertile; and the object of my invention is to provide means for temporarily overflowing large tracts of land and to drain the water off again, as desired.

The invention consists in the various features of improvement more fully pointed out in the claims.

Figure 1:
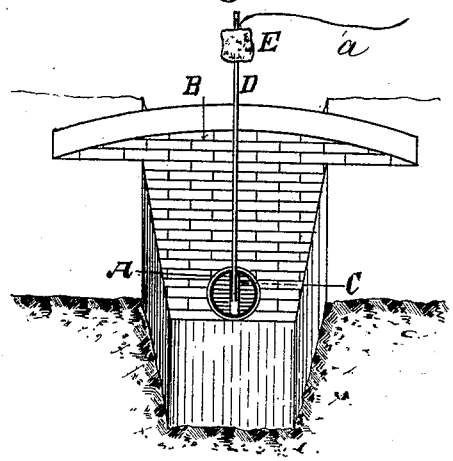
Figure 2:
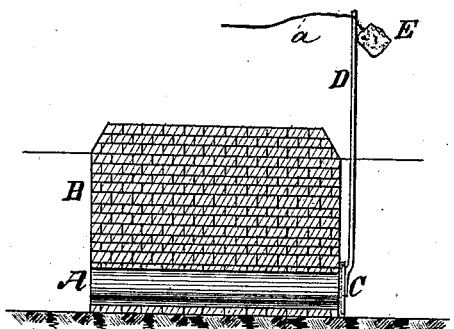
Figure 3:
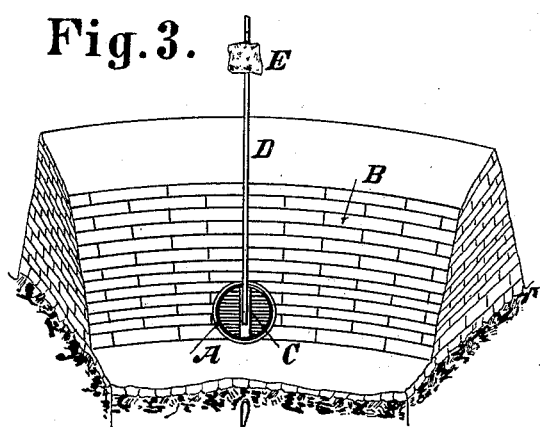
Figure 4:
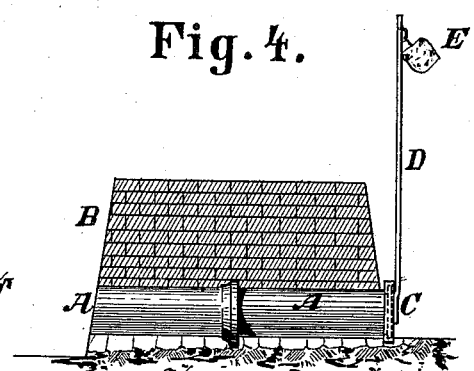
Figure 5:
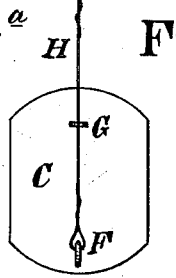
Figure 5:
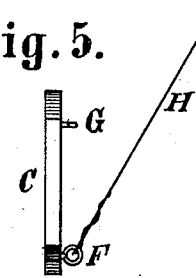

In the accompanying drawings, Figure 1 is a perspective view of an irrigating-sluice provided with my improvement. Fig. 2 is a transverse section of the same. Fig. 3 is a perspective view of a stowing-sluice; Fig. 4, a transverse section of the same. Figs. 5, 5ª, and 5ᵇ represent end, face, and top views of a modification of the lid; and Fig. 6, a longitudinal section of a modification of the sluice-pipe and a side view of the lid.

Into the land, field, or meadow to be irrigated there is dug a trench, into the sole of which fragments of glass or the like are stamped to prevent moles and other animals from undermining the same. At a suitable place within the trench a short socket-pipe A is laid upon the sole in such a position that the socket faces toward the current of water and that the pipe is slightly inclined toward the rear end.

Over the socket-pipe A is built a dam B of earth covered with turf. This dam projects over the level of the brink of the trench and is extended to both sides across the trench, thus causing the water to overflow the trench as soon as the pipe A is closed. With fields or meadows in which the brink of the trench is at a higher level than the tract of land to be irrigated it will be found sufficient to make the height of the dam but slightly in excess of the height of the trench.

For closing the pipe A a lid C is provided, which is connected to a hand-bar D. This hand-bar permits the ready application of the lid to its seat, where it will be held in position by the pressure of the water. The passage from one side of the dam to the opposite side having been shut off by the lid C, the water will of course be forced to flow over the brink of the trench, irrigating the surrounding land. If it is desired to make only part of the water overflow and to conduct the remaining water to the other side of the dam and to the next sluice, a lid is employed, which is partly cut away. According to the position of the opening, more or less water will pass and fill the trench at the rear side of the dam, the overflow of water in front of the dam being proportionately diminished. The lever or rod D is shaped in a manner to allow the lid to fit tightly into the socket of pipe A. To the upper end of the lever or rod D a stone or weight E is hung and a cord $a$ of sufficient length connected to it. If it is desired to stop the irrigation, the lid C is forced off the socket by pressing against its lever or rod D. The weight E will keep the lid on the sole of the trench, and it may then be withdrawn by the cord $a$.

In Figs. 5, 5ª, and 5ᵇ the rod D is replaced by a wire H, connected to an eye F at the lower end of the lid and engaging a hook G at or near the upper end of the lid. To lift the lid, the wire H is first disengaged from hook G, and then a handle or cross-bar is applied to the upper end of the wire to pull the lid off its seat.

The lid may, if desired, be provided with a suitable packing of felt, cloth, or the like.

For stowing-basins the depth of the trench will be increased, and the dimensions of the cross-dam, the socket-pipe A, lid C, and lever D will be also proportionately increased.

Fig. 4 represents a dam B with two connected socket-pipes A and a long lever D applied to the lid C for better overcoming the pressure of water.

Figure 6:
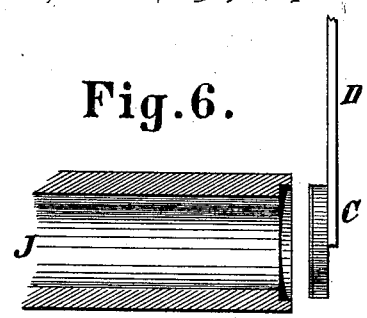

Instead of using a socket-pipe, a smooth pipe, such as shown at J, Fig. 6, may be employed, having a seat at one end to receive the lid C.

What I claim is—

1. The combination of an open trench with a pipe having a seat or socket at one end and placed upon the sole of the trench, a superposed dam extended across the trench at both sides, a vertically-movable lid engaging the socket, and a handle projecting upwardly from the lid through the trench, substantially as specified.

2. The combination of a trench with a pipe placed therein, a superposed dam, a lid closing against one end of the pipe, a wire secured to said lid and projecting upwardly through the trench, with a hook G, secured to the lid and adapted to engage the wire above its point of attachment, substantially as specified.

In testimony whereof I hereunto sign my name, in the presence of two subscribing witnesses, this 11th day of June, 1889.

PAUL ACKERMANN.

Witnesses:
AUGUST HOFFMANN,
AUGUST MÜLLER.